United States Patent
Philipp et al.

(10) Patent No.: US 11,520,010 B2
(45) Date of Patent: Dec. 6, 2022

(54) DYNAMIC POLARIZATION MODULATION OF A LIDAR SYSTEM IN A VEHICLE

(71) Applicant: GM Global Technology Operations LLC, Detroit, MI (US)

(72) Inventors: Tzvi Philipp, Herzliya (IL); Adam L. Wright, Livonia, MI (US); Nathaniel W. Hart, Beverly Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 416 days.

(21) Appl. No.: 16/775,371

(22) Filed: Jan. 29, 2020

(65) Prior Publication Data
US 2021/0231776 A1    Jul. 29, 2021

(51) Int. Cl.
*G01S 7/481* (2006.01)
*G01S 17/08* (2006.01)

(52) U.S. Cl.
CPC .......... *G01S 7/4811* (2013.01); *G01S 7/4817* (2013.01); *G01S 17/08* (2013.01)

(58) Field of Classification Search
CPC ............... H03M 13/09; H03M 13/093; H03M 13/1515; H03M 13/2906; H03M 13/2942
See application file for complete search history.

(56) References Cited

U.S. PATENT DOCUMENTS

| | | | |
|---|---|---|---|
| 10,776,639 B2 | 9/2020 | Steinberg et al. | |
| 2017/0343716 A1 | 11/2017 | Wan et al. | |
| 2018/0113200 A1* | 4/2018 | Steinberg | G01S 7/4814 |
| 2020/0033117 A1* | 1/2020 | Huang | G01B 9/02021 |
| 2020/0393545 A1* | 12/2020 | Shani | G01S 7/4811 |

FOREIGN PATENT DOCUMENTS

| | | |
|---|---|---|
| CN | 107063308 A | 8/2017 |
| CN | 109298406 A | 2/2019 |

OTHER PUBLICATIONS

Chinese Office Action for CN Application No. 202110006226.2, dated Sep. 5, 2022, pp. 1-9.

* cited by examiner

*Primary Examiner* — Kaitlin A Retallick
(74) *Attorney, Agent, or Firm* — Cantor Colburn LLP

(57) ABSTRACT

Systems and methods in a vehicle involve transmitting light with an initial polarization from a lidar system, and controlling an external compensator, external to the lidar system, or an internal compensator within the lidar system to change the initial polarization of the light to a new polarization of the light. The method also includes receiving reflected light resulting from reflection of the light from one or more objects, and obtaining information about the one or more objects based on the reflected light.

18 Claims, 4 Drawing Sheets

DYNAMIC POLARIZATION MODULATION OF A LIDAR SYSTEM IN A VEHICLE

INTRODUCTION

The subject disclosure relates to dynamic polarization modulation of a lidar system in a vehicle.

Vehicles (e.g., automobiles, trucks, construction equipment, farm equipment, automated factory equipment) increasingly employ sensors to obtain information about the vehicle and its environment. The sensor information facilitates augmentation or automation of vehicle operation. Exemplary sensors include a camera, a radio detection and ranging (radar) system, and a light detection and ranging (lidar) system. Generally, a lidar system projects laser illumination with a polarization state that is linear, circular, or a combination of the two (i.e., elliptical). The lidar system measures reflected light that results from the illumination over the field of view (FOV). That is, the laser illumination is reflected by objects in the FOV, and the intensity of this reflected light is measured to obtain information about the objects. Typically in a vehicle application, the lidar system is located in the passenger cabin to transmit light through the windshield and scans across the FOV. The windshield results in a loss of optical transmission of a particular polarization state. Accordingly, it is desirable to provide dynamic polarization modulation of a lidar system in a vehicle.

SUMMARY

In one exemplary embodiment, a method in a vehicle includes transmitting light with an initial polarization from a lidar system, and controlling, using a controller, an external compensator, external to the lidar system, or an internal compensator within the lidar system to change the initial polarization of the light to a new polarization of the light. The method also includes receiving reflected light resulting from reflection of the light from one or more objects, and obtaining information about the one or more objects based on the reflected light.

In addition to one or more of the features described herein, the lidar system transmits light through a transmissive window of the vehicle, and the controlling the external compensator includes changing the initial polarization of the light to the new polarization prior to the light crossing the transmissive window.

In addition to one or more of the features described herein, the controlling the external compensator includes controlling voltage to a liquid crystal variable retarder (LCVR).

In addition to one or more of the features described herein, the controlling the external compensator is performed to control instantaneous polarization based on angular coordinates of a scanning beam direction provided by the lidar system.

In addition to one or more of the features described herein, the controlling the external compensator is performed between frames of the lidar system based on the detection of the one or more objects in previous frames.

In addition to one or more of the features described herein, the method also includes obtaining a feedback of the new polarization as a function of time and temperature.

In addition to one or more of the features described herein, the obtaining the information about the one or more objects includes obtaining a material, a geometry, and a surface property of each of the one or more objects.

In addition to one or more of the features described herein, the controlling the external compensator includes controlling a magnetically controlled polarization element.

In addition to one or more of the features described herein, the controlling the external compensator includes rotating a phase plate mechanically using a motor.

In addition to one or more of the features described herein, the controlling the external compensator includes rotating a Fresnel prism to an optic axis via a motor stage.

In another exemplary embodiments, a system in a vehicle includes a lidar system to transmit light with an initial polarization, and an external compensator outside the lidar system or an internal compensator within the lidar system. The system also includes a controller to control the external compensator or the internal compensator to change the initial polarization of the light to a new polarization of the light. Reflected light resulting from reflection of the light from one or more objects is received, and information about the one or more objects is obtained based on the reflected light.

In addition to one or more of the features described herein, the lidar system transmits light through a transmissive window of the vehicle, and the controller changes the initial polarization of the light to the new polarization prior to the light crossing the transmissive window.

In addition to one or more of the features described herein, the external compensator is a liquid crystal variable retarder (LCVR) and the controller controls a voltage provided to the LCVR.

In addition to one or more of the features described herein, the controller controls instantaneous polarization of the light from the lidar system based on angular coordinates of a scanning beam direction provided by the lidar system.

In addition to one or more of the features described herein, the controller controls polarization of the light between frames of the lidar system based on the detection of the one or more objects in previous frames.

In addition to one or more of the features described herein, the controller obtains a feedback of the new polarization as a function of time and temperature.

In addition to one or more of the features described herein, the information about the one or more objects includes obtaining a material, a geometry, and a surface property of each of the one or more objects.

In addition to one or more of the features described herein, the external compensator is a magnetically controlled polarization element.

In addition to one or more of the features described herein, the external compensator is a phase plate rotated mechanically using a motor.

In addition to one or more of the features described herein, the external compensator is a Fresnel prism rotated to an optic axis via a motor stage.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
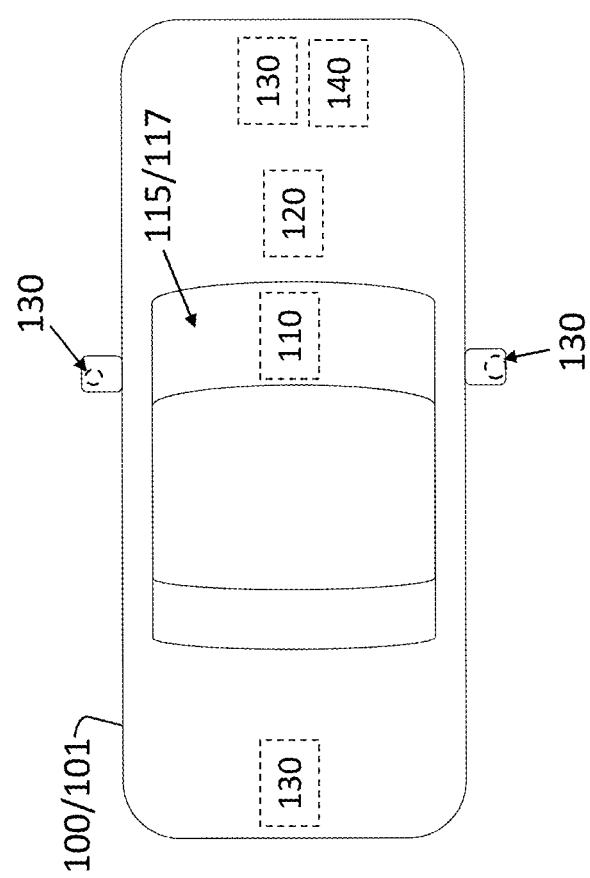
FIG. 1 is a block diagram of a vehicle that exhibits dynamic polarization modulation of a lidar system according to one or more embodiments.

The following description is merely exemplary in nature and is not intended to limit the present disclosure, its application or uses. It should be understood that throughout the drawings, corresponding reference numerals indicate like or corresponding parts and features.

As previously noted, a lidar system is among the exemplary sensors that may be used in a vehicle. The lidar system may be located behind the windshield in the passenger compartment of the vehicle in order to keep it clean. However, there is a loss of optical transmission by the lidar system to outside the vehicle. The loss is directly related to the Fresnel reflection coefficients that determine the amount of light that is reflected from a surface (i.e., the windshield) for a given incident angle, a given polarization state, and given material characteristics. The loss in optical power can be as much as 70 percent in some cases and cannot be entirely alleviated by the application of anti-reflection coatings on the windshield because of the coating design, manufacturing costs, and coating durability.

Embodiments of the systems and methods detailed herein relate to the dynamic polarization modulation of a lidar system in a vehicle. According to an exemplary embodiments, a liquid crystal (LC) phase modulator facilitates tuning the polarization to enhance resolution. Specifically, according to an exemplary embodiment, a liquid crystal variable retarder (LCVR) optical phase plate, which is similar to a quarter wave plate, is used to dynamically modulate the polarization state of the lidar beam to minimize polarization losses. While the location of the lidar system behind the windshield is discussed as an exemplary reason for optical loss, the location of the lidar system and the efficacy of the dynamic polarization modulation technique are not limited by the exemplary case. The windshield or other source of optical loss represents an external constraint that was not designed into the lidar system. Thus, the LCVR or other mechanism, as discussed further, represents an external compensator to address the constraint.

In accordance with an exemplary embodiment, FIG. 1 is a block diagram of a vehicle 100 that exhibits dynamic polarization modulation of a lidar system 110. The exemplary vehicle 100 in FIG. 1 is an automobile 101. The lidar system 110 is shown within the passenger compartment behind a transmissive surface 117, which is the windshield 115 in the case of the vehicle 100. The transmissive surface 117 is transmissive to light from the lidar system 110. Cameras 130 and a radar system 140 are also shown along with a controller 120. The numbers and locations of the sensors and controller 120 are not intended to be limited by the exemplary illustration. The controller 120 includes processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
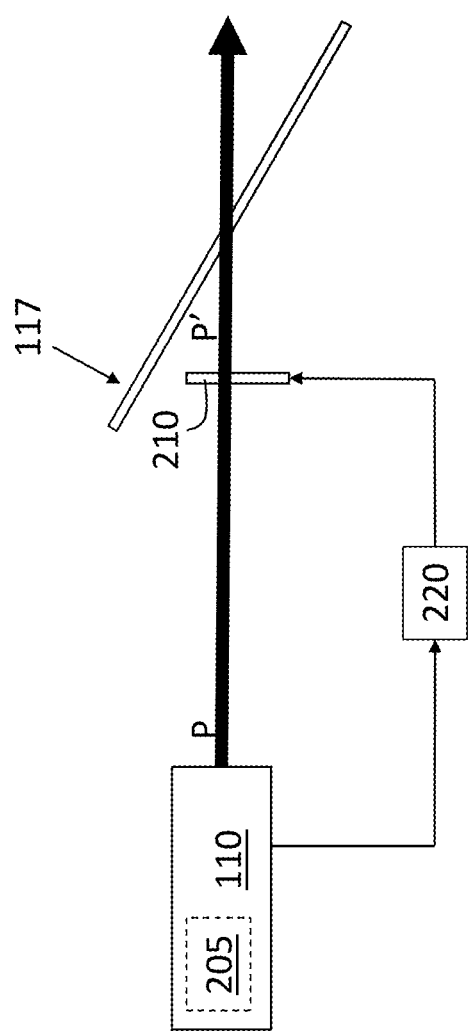
FIG. 2 details an exemplary lidar system with dynamic polarization modulation according to one or more embodiments.

FIG. 2 details an exemplary lidar system 110 with dynamic polarization modulation according to one or more embodiments. The lidar system 110 is shown behind a transmissive surface 117 (e.g., windshield 115). The transmissive surface 117 may have an anti-reflection coating. The lidar system 110 provides an output with polarization P, as shown. An LCVR 210 is shown between the lidar system 110 and the transmissive surface 117. As indicated, at block 220, information is obtained from the lidar system 110 to determine control. In the exemplary case, the control is of the voltage to the LCVR 210, which affects the polarization P' of the lidar output downstream of the LCVR 210. The information from the lidar system 110 may indicate the incident beam angle on the transmissive surface 117, for example. As part of the processes at block 220, which may be performed by the controller 120 (FIG. 1), a look-up table (LUT) may be consulted to associate the information from the lidar system 110 (e.g., incident beam angle) with a corresponding voltage (i.e., polarization).

While the LCVR 210 is shown in FIG. 2 as an exemplary mechanism for controlling the polarization of the signal from the lidar system 110, the LCVR 210 is only one example. Other external compensators may be used instead of the LCVR 210 according to alternate embodiments. For example, a magnetically controlled polarization element may be used or a phase plate (e.g., quarter wave plate) may be rotated mechanically via a motor. As another example, a phase shift may be achieved by a Fresnel prism rotated to the optic axis via a motor stage. For any of the alternate external compensating mechanisms, a corresponding LUT may be developed and calibrated such that each scan angle (i.e., incident beam angle) is associated with a polarization.

An optional internal compensator 205 (e.g., retarder), which is part of the lidar system 110, is also shown in FIG. 2. According to alternate embodiments, the controller 120 may control the polarization output by the lidar system 110 using the internal compensator 205 rather than changing the polarization output by the lidar system 110 using an external compensator such as the LCVR 210.

As further discussed with reference to FIGS. 3 and 4, the polarization state may be varied within a scan sweep (i.e., within a frame) or from frame-to-frame. The intra frame instantaneous polarization control (according to the embodiment of FIG. 3) may minimize polarization losses. The frame-to-frame control of polarization (according to the embodiment of FIG. 4) may additionally consider objects detected in the FOV of the lidar system to adjust the polarization in a way that enhances detection. Polarization-based lidar detections facilitate the determination of physical characteristics of detected objects such as material, geometry, and surface properties. Generally, light propagation from the lidar system 110 through the transmissive surface 117 changes over the FOV, over time, and based on the object being illuminated. The variation of polarization state within a frame, as discussed with reference to FIG. 3, addresses the change in light propagation over the FOV. The variation of polarization state from frame-to-frame, as discussed with reference to FIG. 4, addresses the change in light propagation based on the object being detected. The feedback discussed with reference to FIGS. 3 and 4 addresses the change in light propagation over time.

Figure 3:
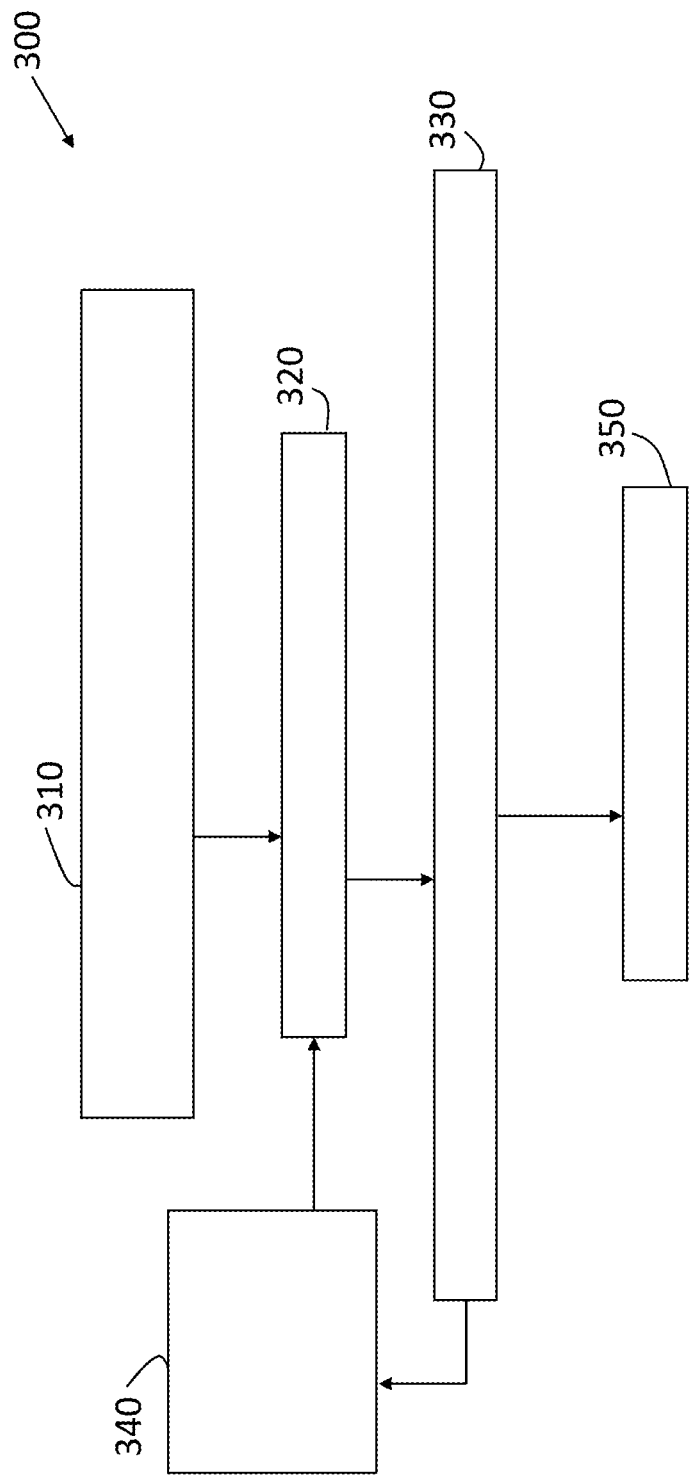
FIG. 3 is a process flow of a method of performing dynamic polarization modulation according to one or more embodiments.

FIG. 3 is a process flow of a method 300 of performing dynamic polarization modulation according to one or more embodiments. The method 300 facilitates polarization change within a frame of the lidar system 110 using the LCVR 210 (FIG. 2). The processes at blocks 310 through 340 may be performed iteratively for each scanning beam angle of the lidar system 110. At block 310, obtaining current angular coordinates of the scanning beam direction from the lidar system 110 refers to the controller 120 obtaining this information according to an exemplary embodiment. At block 320, using a LUT refers to looking up the incident angle on the transmissive surface 117 that corresponds with the scan angle indicated by the scanning beam direction angular coordinates. The incident angle on the transmissive surface 117 indicates the optimal polarization state that is pre-calibrated. The voltage (in the case of the LCVR 210) to achieve this optimal polarization state is determined as an output from block 320.

At block 330, the processes include modulating the LCVR 210 inter frame (i.e., varying the instantaneous polarization) for each scan position across the transmissive surface 117. That is, the voltage value determined at block 320 is applied to the LCVR 210. At block 340, providing feedback as a function of time and temperature refers to monitoring the actual result of the voltage control (at block 330) which may vary over time and temperature. At block 350, performing detection over the FOV refers to identifying objects over the FOV of the lidar system 110 and, as previously noted, may include determining the material, geometry, and surface properties of objects. As previously noted, the mechanism used to change polarization state need not be limited to the LCVR 210. Thus, according to alternate embodiments, the value determined at block 320 and applied to modulate polarization state of the lidar system 110 at block 330 may be different according to different mechanisms. That is, whether a different external compensator than the LCVR 210 is used or an internal compensator 205 is used instead, blocks 320 and 330 may be modified to control the polarization P' that is ultimately transmitted through the transmissive surface 117.

Figure 4:
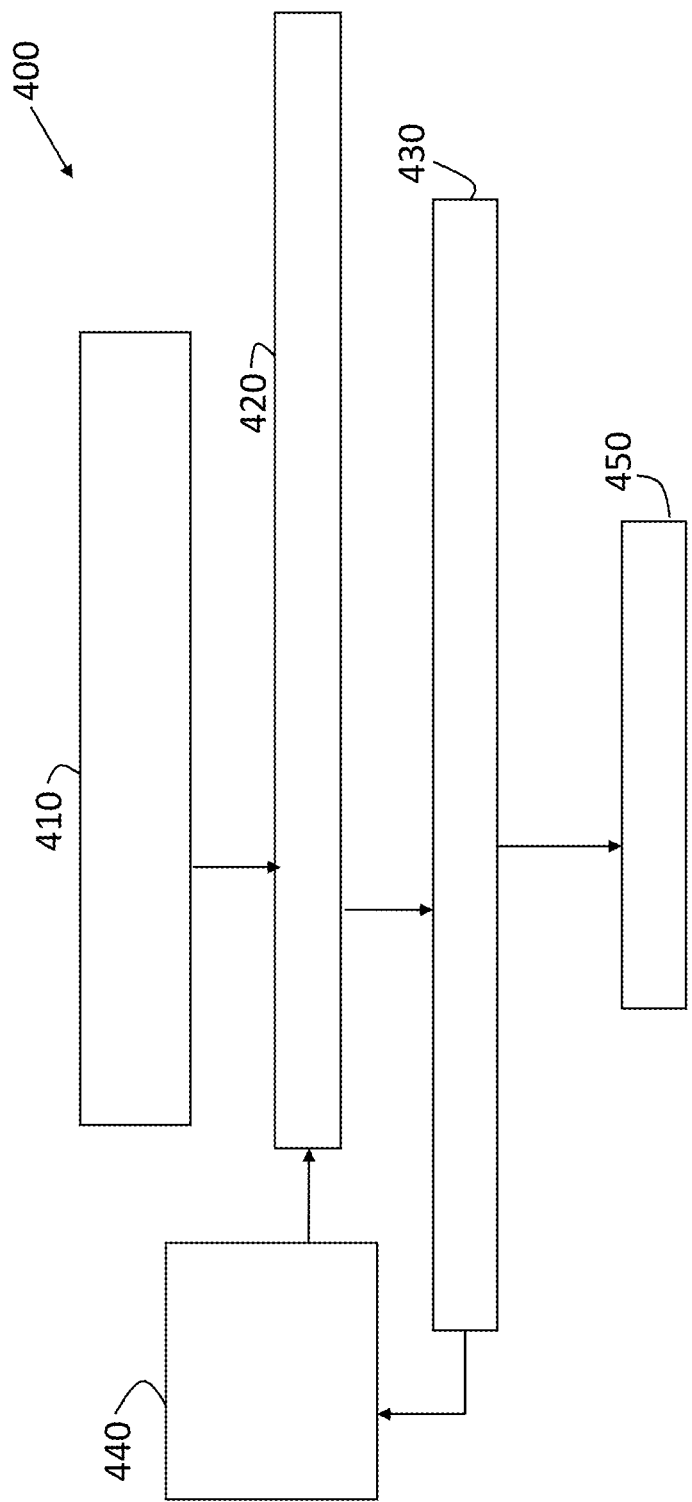
FIG. 4 is a process flow of a method of performing dynamic polarization modulation according to other embodiments.

FIG. 4 is a process flow of a method 400 of performing dynamic polarization modulation according to one or more embodiments. The method 400 facilitates polarization change from one frame to the next of the lidar system 110. The processes at blocks 410 through 440 may be performed iteratively for each frame of the lidar system 110. At block 410, obtaining the current angular coordinates of the scanning beam direction from the lidar system 110 refers to the controller 120 obtaining this information. The lidar system 110 detects objects from a point cloud of reflections that the lidar system 110 receives based on transmitting the light at a given polarization state. The particular angular coordinates of objects detected in the point cloud are determined in part from the information received at block 410. At block 420, using the LUT and detection of objects in previous frames refers to determining alternate polarization states that may provide additional information about the objects.

At block 430, modulating the LCVR 210 refers to applying the voltage determined at block 420. As previously noted, the processes at blocks 420 and 430 may differ based on an alternate mechanism, internal or external to the lidar system 110, for controlling the polarization P' of light through the transmissive surface 117. At block 440, providing feedback as a function of time and temperature refers to monitoring the actual result of the voltage control (at block 430) which may vary over time and temperature. At block 450, performing detection over the FOV refers to identifying objects over the FOV of the lidar system 110 and, as previously noted, may include determining the material, geometry, and surface properties of objects.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method in a vehicle, the method comprising:
transmitting light with an initial polarization from a lidar system;
controlling, using a controller, an external compensator, external to the lidar system, or an internal compensator within the lidar system to change the initial polarization of the light to a new polarization of the light;
receiving reflected light resulting from reflection of the light from one or more objects;
obtaining information about the one or more objects based on the reflected light; and
obtaining a feedback of the new polarization as a function of time and temperature.

2. The method according to claim 1, wherein the lidar system transmits light through a transmissive window of the vehicle, and the controlling the external compensator includes changing the initial polarization of the light to the new polarization prior to the light crossing the transmissive window.

3. The method according to claim 1, wherein the controlling the external compensator includes controlling voltage to a liquid crystal variable retarder (LCVR).

4. The method according to claim 1, wherein the controlling the external compensator is performed to control instantaneous polarization based on angular coordinates of a scanning beam direction provided by the lidar system.

5. The method according to claim 1, wherein the controlling the external compensator is performed between frames of the lidar system based on the detection of the one or more objects in previous frames.

6. The method according to claim 1, wherein the obtaining the information about the one or more objects includes obtaining a material, a geometry, and a surface property of each of the one or more objects.

7. The method according to claim 1, wherein the controlling the external compensator includes controlling a magnetically controlled polarization element.

8. The method according to claim 1, wherein the controlling the external compensator includes rotating a phase plate mechanically using a motor.

9. The method according to claim 1, wherein the controlling the external compensator includes rotating a Fresnel prism to an optic axis via a motor stage.

10. A system in a vehicle, the system comprising:
a lidar system configured to transmit light with an initial polarization;
an external compensator outside the lidar system or an internal compensator within the lidar system; and
a controller configured to control the external compensator or the internal compensator to change the initial polarization of the light to a new polarization of the light, wherein reflected light resulting from reflection of the light from one or more objects is received, and information about the one or more objects is obtained based on the reflected light, wherein the controller is configured to obtain a feedback of the new polarization as a function of time and temperature.

11. The system according to claim 10, wherein the lidar system is configured to transmit light through a transmissive window of the vehicle, and the controller is configured to change the initial polarization of the light to the new polarization prior to the light crossing the transmissive window.

12. The system according to claim 10, wherein the external compensator is a liquid crystal variable retarder (LCVR) and the controller is configured to control a voltage provided to the LCVR.

13. The system according to claim 10, wherein the controller is configured to control instantaneous polarization of the light from the lidar system based on angular coordinates of a scanning beam direction provided by the lidar system.

14. The system according to claim 10, wherein the controller is configured to control polarization of the light between frames of the lidar system based on the detection of the one or more objects in previous frames.

15. The system according to claim 10, wherein the information about the one or more objects includes obtaining a material, a geometry, and a surface property of each of the one or more objects.

16. The system according to claim 10, wherein the external compensator is a magnetically controlled polarization element.

17. The system according to claim 10, wherein the external compensator is a phase plate rotated mechanically using a motor.

18. The system according to claim 10, wherein the external compensator is a Fresnel prism rotated to an optic axis via a motor stage.

* * * * *